July 29, 1969
J. H. BING ET AL
3,458,088
MATERIAL UNLOADERS
Filed Feb. 21, 1968
3 Sheets-Sheet 1
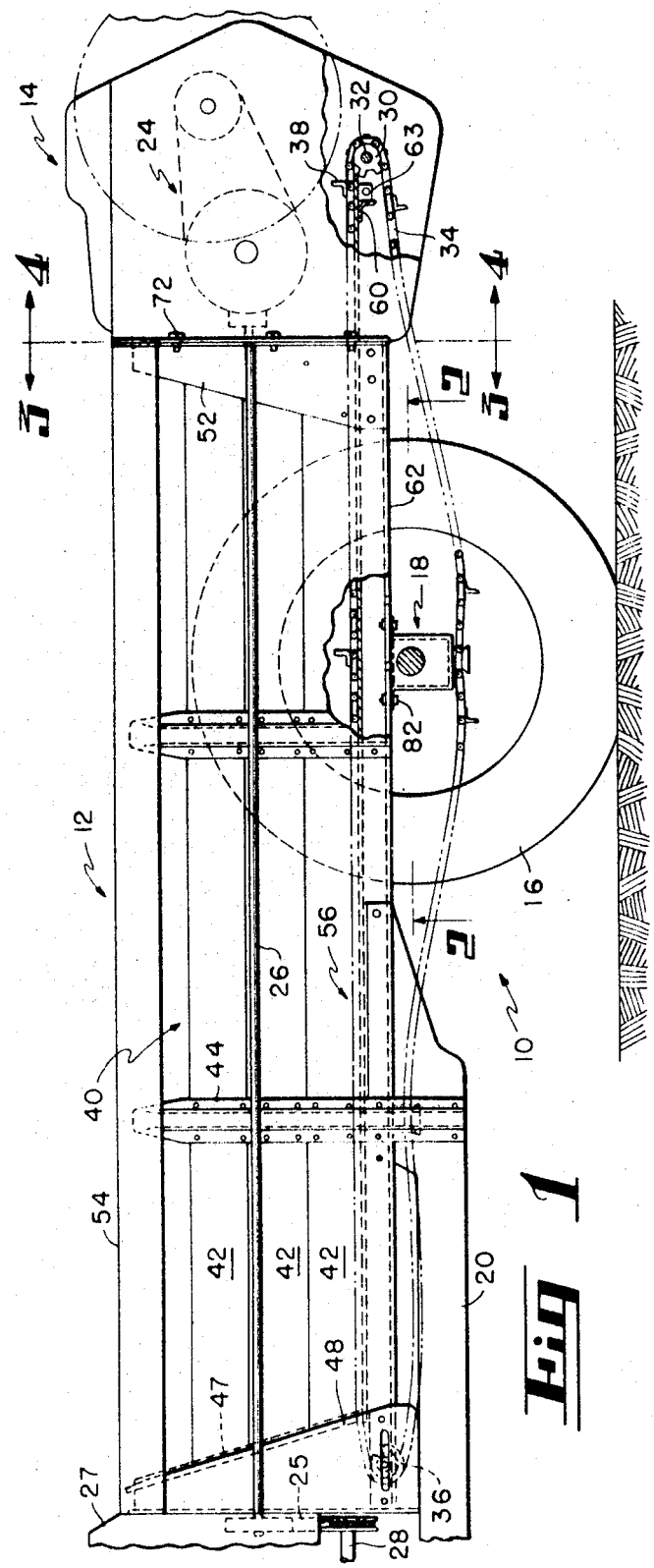
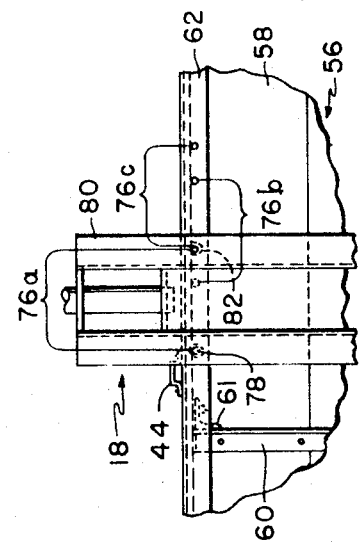
INVENTORS.
JOHN H. BING
LAWRENCE J. VAGEDES
PAUL A. LUTHMAN
HERBERT W. COLWILL
BY Charles M. Hogan
Gary M. Brown
ATTORNEYS.

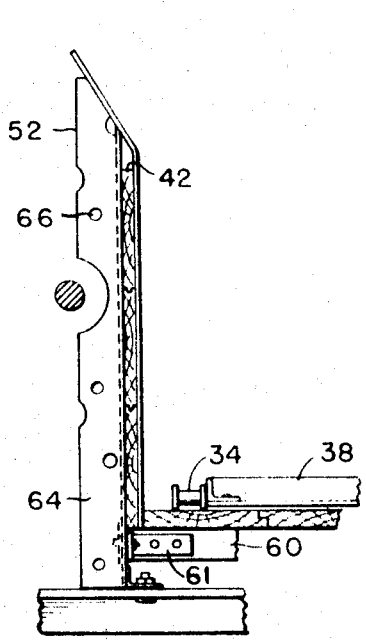
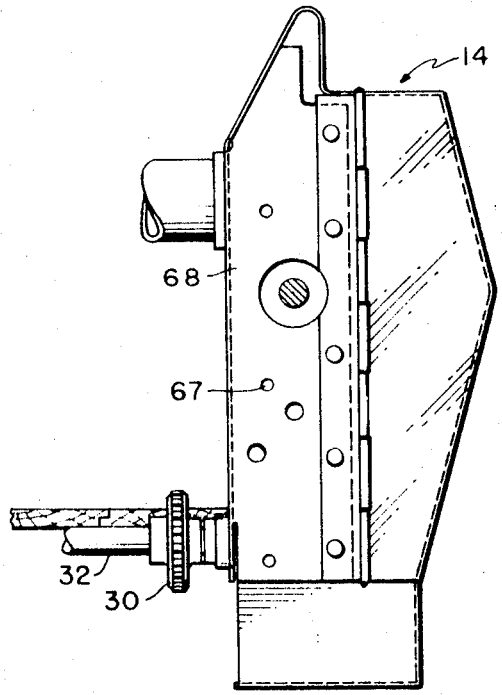
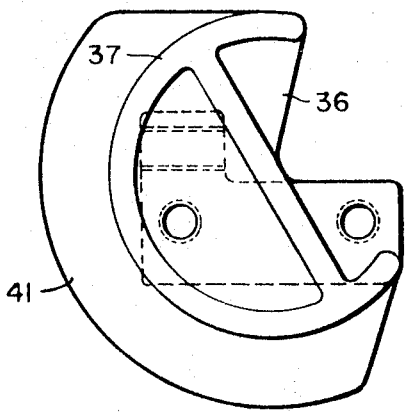

INVENTORS.
JOHN H. BING
LAWRENCE J. VAGEDES
PAUL A. LUTHMAN
HERBERT W. COLWILL
BY

ATTORNEYS.

United States Patent Office

3,458,088
Patented July 29, 1969

3,458,088
MATERIAL UNLOADERS
John H. Bing, Greenville, Lawrence J. Vagedes, Celina, Paul A. Luthman, Maria Stein, and Herbert W. Colwill, Celina, Ohio, assignors to Avco Corporation, Coldwater, Ohio, a corporation of Delaware
Filed Feb. 21, 1968, Ser. No. 707,154
Int. Cl. B67d *5/64;* B62d *63/08*
U.S. Cl. 222—178                                                    8 Claims

ABSTRACT OF THE DISCLOSURE

The disclosure illustrates a transportable material unloader, such as a manure spreader, having a standard box assembly for use with a number of types of spreader mechanisms, each mechanism having a different weight. An axle and wheel assembly is secured to the box at predetermined distances from the threaded mechanism, the positions being selected so that the center of gravity of the spreader is always forward of the axle assembly. In addition, the box has a standard cross section area so that the length of the box alone is varied to provide a range of material capacities for the spreader.

---

The present invention relates to material unloaders and more specifically to transportable types of unloaders which are designed to uniformly distribute material over the area traversed.

For a number of years, material unloaders such as manure spreaders used for farm application have been shipped by manufacturers to farm dealers in disassembled form in order to save shipping costs. Final assembly of the spreader is then performed by the dealer who sells the completed unit to the customer. While effective in cutting down shipping costs, this practice has led to problems in final assembly because spreader units have become more complex, thus requiring a greater number of individual parts. This problem has been aggravated still further by the introduction of diverse types of distributing mechanisms for spreaders, such as cylinder/paddle types, single beater types and flail types. In addition, it has become necessary to manufacture a line of spreaders having different capacities to meet a broad range of farming needs. All these factors add to the cost and complexities of manufacturing, packaging, shipping and assembling the diverse types of manure spreaders.

Accordingly, it is a prime object of the present invention to greatly simplify the construction of material unloaders, thereby enabling easy assembly thereof and lower manufacturing costs.

It is a further object of the present invention to provide a maximum interchangeability between individual components of material unloaders to minimize the number of components necessary to be manufactured for a diverse line of material unloaders.

The above objects are achieved in one aspect of the invention by providing a novel bed unit for a transportable material unloader having wheel means and a forward extending hitch for generally three-point support. The material unloader is adapted to use one of a plurality of distributing units for discharging material from the aft end of the unloader, each of the distributing units having different weights. The bed unit comprises a pair of side walls connected by a floor member. Means are secured to the aft ends of the side walls and the floor member for interchangeably mounting a selected distributing unit to the bed unit. The wheel means is mounted to the floor member at a predetermined longitudinal distance from the distributing unit mounting means. The predetermined distance corresponds to the weight of the particular distributing unit selected so that the center of gravity of the material unloaders is between the wheel means and the hitch.

The above and other related objects and features of the present invention will be apparent from a reading of a description of the disclosure found in the accompanying drawings and the novelty thereof pointed out in the appended claims.

In the drawings:

FIGURE 1 is a side view of the material unloader embodying the present invention;

FIGURE 2 is an underside view of the material unloader of FIGURE 1 taken on line 2—2;

Figure 6:
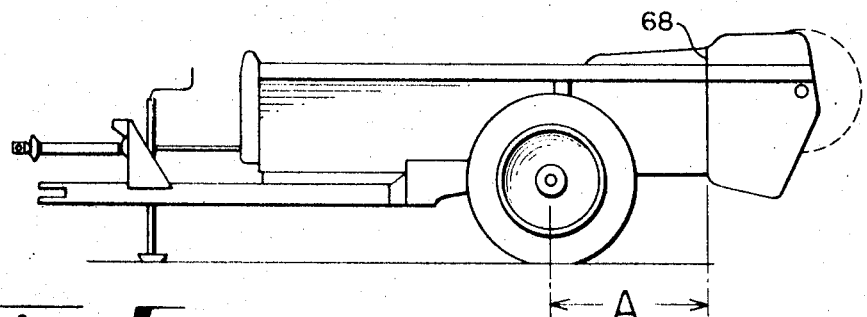
Figure 7:
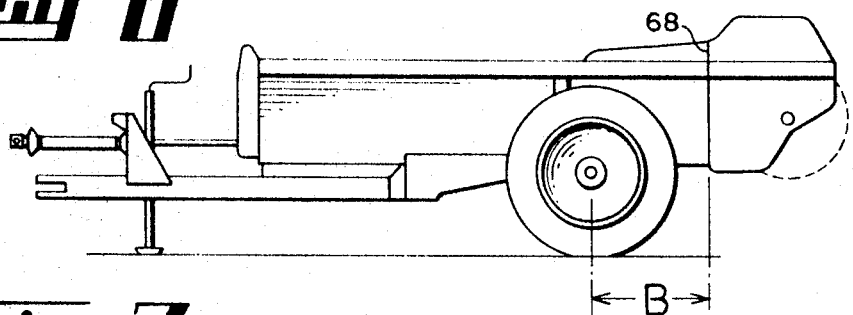
Figure 8:
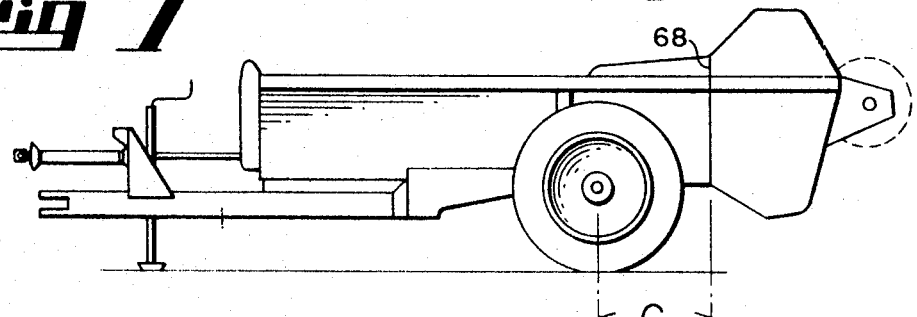
Figure 9:
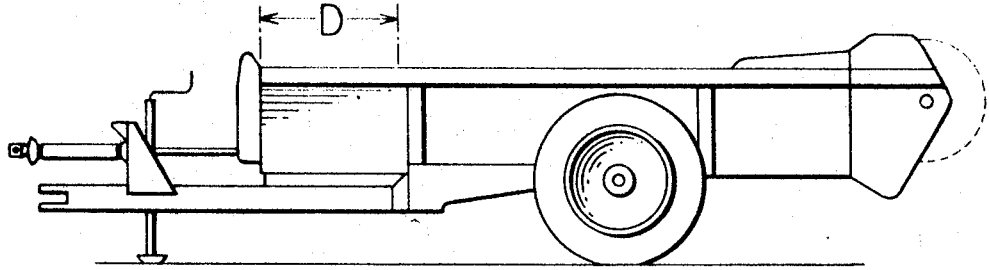

FIGURES 3 and 4 are views taken respectively on lines 3—3 and 4—4 and looking in the direction of the arrows;

FIGURE 5 is a fragmentary enlarged view of a portion of the spreader shown in FIGURE 1, illustrating a particular feature of the present invention;

FIGURES 6, 7 and 8 illustrate in highly simplified fashion, the interchangeability of the material unloader of FIGURE 1;

FIGURE 9 shows in simplified fashion another feature of the present invention.

Reference is now had to FIGURE 1 which shows a transportable spreader 10 comprising a bed unit 12 in which material to be unloaded, such as manure, is placed and a distributor unit 14 which receives the manure from the bed 12 for distribution in a predetermined pattern. The spreader 10 is supported for movement along the ground by a pair of wheels 16 (only one of which is shown) journaled on an axle unit 18. A Y frame 20 extends from the forward portion of the bed 12 for connection at a hitch (not shown) with a suitable propulsion vehicle, such as a tractor (also not shown).

The distributor unit 14, as later discussed in detail, may be a single beater mechanism, as shown, or any one of a number of distributing units which break up and discharge manure from the spreader in a uniform pattern. The distributor unit 14 has a drive unit generally indicated by reference number 24 which rotates teeth and/or paddles in the distributing unit 14. The drive unit 24 through a suitable mechanism (not shown) also rotates a pair of conveyor drive sprockets 30 mounted on a cross shaft 32. A pair of endless chains 34 each have an aft loop wrapped around one of the drive sprockets 30 and a forward loop journaled around one of a pair of sliders 36. As shown in detail in FIGURE 5, the sliders 36 each comprise an arcuate sleeve 37 bolted to the bed at a slot 39 and having tapered arcuate flanges 41 to center the forward loop of the chains 34. The sliders 36 may be adjustable in a fore and aft direction to permit adjustable tensioning of the chains 34. The chains 34 have a series of L-shaped bars 38 extending therebetween to form a conveyor so that rotation of the drive sprockets 30 by the drive unit 24 causes material in the bed until 12 to be urged towards the distributing unit 14 which discharges the material from the spreader 10.

The drive unit receives a power input from an interconnecting drive shaft 26 extending to a housing 27 at the forward end of the bed unit 12. A chain drive mechanism 25 in the housing 27 couples the shaft 26 to an input shaft 28 which is normally connected to a power-take-off shaft (PTO) of the propulsion vehicle for the spreader 10.

The housing 27 may also contain a control mechanism that, in response to operator demand, controls the operation of the drive unit 24 for varying the operation of the conveyor and distributing unit 14. An example of a control mechanism especially suitable for this purpose may be found in the copending application entitled "Improvements in Feed Controls for Material Unloaders," in the name of Vagedes and Bing, Ser. No. 701,666, filed Jan. 30, 1968, and assigned to the same assignee as the present invention.

The bed unit 12 includes side walls 40 which are comprised of a series of wooden boards 42 of sufficiently high strength and durability to provide a substantially support for the material unloader 12. Intermediate vertical braces 44 tie the boards 42 together. Flanges 48 are bolted to the forward portions of the boards 42 and provide a mounting surface for a forward wall 47 of the bed unit 12 and the housing 27. Flanges 52 are secured to the aft ends of the boards 42 to form supports for the distributing unit 14. An L-shaped bar 62 is riveted to the intermediate braces 44 and bolted to flanges 48, 52 adjacent the bottom boards 42 of the side walls 40, to structurally stiffen the side walls and provide a mount for the axle unit 18 as later described. Flail boards 54 of sheet steel are secured to the top edges of the side boards 42 and the vertical struts 44, flanges 48 and 52 to structurally stiffen the side walls 40 and enable additional material handling capacity.

Referring particularly to FIGURES 1 and 2, the bed unit 12 further includes a floor member 56 comprised of a series of structurally rigid boards 58 bolted to a series of cross members 60. The ends of the intermediate cross members 60 have tabs 61 which are bolted to vertical walls of the L-shaped bar 62. The aftmost cross member 60 has a pair of tabs 63 bolted to the distributing unit 14.

As previously described, the aft flange members 52 of the bed unit 12 are adapted to mount one of a number of distributing units 14 to the bed unit 12. For this purpose the flange members 52 include aft facing coplanar faces 64 (only one of which is shown) which have a series of mounting holes 66 in a predetermined pattern, as shown in FIGURE 3. This pattern of mounting holes corresponds to an identical pattern of mounting holes 67 formed in a mounting face 68 on the distributing unit 14, as shown in FIGURE 4. Each of the distributing units selected to be used with the spreader bed unit 12 is then formed with a standard mounting hole pattern which registers with the mounting holes 66 formed in the faces 64 of the flange units 52. Bolt and nut assemblies 72 extend through the registered mounting holes 66, 67 to secure the distributing unit 14 to the bed unit 12 along an essentially rearward facing vertical plane.

The L-shaped member 62 has a plurality of holes 76a, 76b, and 76c formed in the bottom faces thereof to enable mounting of the axle unit 18 to the bed unit 12. Each pair of holes 76a corresponds with a pair of holes 78 formed in forward and rearward flanges 80 of the axle unit 18. Bolt and nut assemblies 82 extend through the corresponding openings to bolt the axle unit 18 to the bed unit 12 at one of a plurality of positions, determined by the corresponding bolt holes 76a, 76b, or 76c.

This is done so as to enable a given bed size to be utilized with different types of distributing units. As previously pointed out, the distributing units adapted for use with the bed have a standard mounting hole pattern so that each unit may be mounted on the aft faces 68 of the flanges 52. Examples of different types of spreader units are the single beater unit, as shown in simplified fashion in FIGURES 1, 6 and 9, a flail-type distributing unit as shown in FIGURE 7, and a cylinder and paddle type illustrated in FIGURE 8. While each of these distributing units is adapted for interchangeable mounting to the bed units, they have different weights which necessitate correct placement of the axle unit 18 in relation to the distributing unit selected. This is necessary to avoid the extremes of either too great a downward load on a tractor drawbar at the hitch of the Y frame 20 or a negative or upward force. In addition, it is desirable to have the center of gravity of the spreader in an unloaded condition to be slightly ahead of the axle unit to enable movement of the spreader by an individual. Accordingly, the axle 18 is placed by utilizing the different sets of mounting holes a, b or c, so that the center of gravity of the spreader 10 is forward of and adjacent the axle unit 18 for the spreader in an unloaded condition. It is apparent that with a full load the center of gravity would be shifted in a forward direction and would gradually move towards the axle unit 18 as the material is being discharged from the spreader 10.

FIGURES 6, 7 and 8, respectively, illustrate the relative positions for a single beater, flail and cylinder/paddle type of distributing unit. Of these units the single beater unit is the lightest and the cylinder/paddle unit the heaviest. Thus in FIGURE 6 a single beater is mounted in the mounting holes a at a distance A from the bed mounting face 68. In FIGURE 7 a flail type is mounted in holes b at a distance B from the mounting face 68 which is less than A. As shown in FIGURE 8, a cylinder/paddle unit, the heaviest of the units, is positioned at the closest distance C from the mounting faces 68. It is apparent then that the mounting arrangement enables one of a number of distributing units to be used with a single standard bed unit without any effect on the weight distribution of the material unloader.

The use of a standard bed unit mounting face 64 results in a standard cross section for the bed unit 12. As a result, only the side walls and bottom member of the bed unit 12 are made longer to achieve a higher material handling capacity, as illustrated in FIGURE 9. In FIGURE 9 the side walls and floor member have lengths greater than the length of the units shown in FIGURES 6–8 by distance D to achieve a higher material capacity. It should be understood that with lengthened side and floor members the mounting holes would be selected to compensate for the difference in weight between the plurality of distributor units available to be used with the spreader 10. By utilizing a standard box unit with an interchangeable mounted distributing unit and placing the axle by means of the predetermined mounting holes, a wide range of spreader types and capacity may be achieved with a substantial simplification of components. It is quite apparent that such an arrangement would enable a simplification of assembly which ultimately results in an economic savings. As a typical example, spreaders according to the present invention may be constructed with side walls and floor members to accommodate material capacity of 135 bushels, 165 bushels and 195 bushels. Each of these capacity units may utilize any one of the distributor units shown in FIGURES 6–8. As a result, a total of nine different combinations are utilized by providing only three distributing units and three basic bed units. The remaining portion of the components may be standard and usable on all of the various combinations.

The spreader described above enables a high degree of simplicity in the final assembly of a selected unit. It should be noted that the vertical faces 64 of the flange units 52 enable an extremely simplified alignment between the mounting holes on the distributing units selected and the mounting holes on the bed units 12. This mounting along an essentially vertical plane results in a very rigid structure because the side walls of the bed unit 12 resist not only vertical but lateral deflection.

In addition, the spreader bed unit is simplified by the use of the slider sleeves 36 in place of usual idler gears to provide a simplified, self-cleaning, journaling support for the front loops of the chains 34.

While a preferred embodiment of the present invention has been described, it is apparent that modifications may be arrived at by those skilled in the art without departing from the spirit and scope of the present invention.

Having claimed the invention, what is novel and desired to be secured by Letters Patent of the United States is:

1. In a transportable material unloader having wheel means and a forward extending hitch for generally three-point support and adapted to use one of a plurality of distributing units for discharging material from the aft end of said unloader, said distributing units having different weights; a bed unit in which said material is conveyed to said discharge unit, said bed unit comprising:

a pair of side walls connected by a floor member;

a means secured to the aft ends of said side walls and said floor member for interchangeably mounting a selected distributing unit to said bed unit; and means for mounting said wheel means to said bed unit at a predetermined longitudinal distance from said distributing unit mounting means, said predetermined distance corresponding to the weight of the particular distributing unit selected so that the center of gravity of said material unloader is between said wheel means and said hitch.

2. Apparatus as in claim 1 wherein:
said side walls and floor member have fixed cross section dimensions and a predetermined length sufficient to accommodate a given capacity of material in said bed unit.

3. Apparatus as in claim 1 wherein each of said distributing units has a standard pattern of forward facing openings and wherein:
said side walls are sufficiently rigid to provide substantial structural support for said bed unit,
said distributing unit mounting means comprises:
L-shaped flange members secured to the aft ends of said side walls, said flange members having aft facing mounting faces with predetermined openings therein for registry with the pattern of openings in said distributing units; and
bolt means extendable through said registered holes for securing a selected distributing unit to said bed unit along said flange member.

4. Apparatus as in claim 1 wherein said wheel means comprises a pair of wheels interconnected by an axle assembly having openings therein in general vertical alignment with said side walls and wherein said means for mounting said wheel means to said bed unit comprises:
a mounting face having predetermined sets of openings therein for registry with the openings in said axle assembly thereby to mount the axle assembly at said predetermined longitudinal distance, and
bolt means extendable through the registered sets of openings in said mounting face and said axle assembly for connection therebetween.

5. Apparatus as in claim 4 wherein said floor member and said side walls are formed from a plurality of wooden boards sufficiently rigid to form a substantial structural support of said bed unit and wherein:
said floor member and said side walls further comprise transverse braces for interconnecting said boards;
said mounting face comprises a longitudinal L-shaped member connected to the transverse braces of said side walls and to the transverse braces of said floor member.

6. Apparatus as in claim 5 wherein said distributing unit mounting means comprises:
a vertical extending L-shaped flange secured to the aft ends of each of said side walls and having an aft directed mounting face with openings therein for registry with openings in said distributing units, and
bolt means extendable through said openings in said flange for mounting a selected distributing unit to said flange member so that the primary structural connection between said distributing unit and said bed unit is through said flange face.

7. Apparatus as in claim 6 in combination with conveyor means comprising:
a pair of endless chains extending in a generally longitudinal direction over and under said floor member adjacent the side walls, said chains having forward and aft loops;
a plurality of bars normal to and extending between said chains;
sprocket means positioned at the aft loop of said chains for driving said chains around said floor member for causing said bars to move towards the aft end of said bed unit on the top side of said floor member; and
means positioned at the forward end of said floor member for journaling the forward loop of said chains.

8. Apparatus as in claim 7 wherein said means for journaling the forward loop of said chains comprises:
a pair of arcuate sleeve members secured to said side walls adjacent the forward end of said floor member so that the forward loops of said chains slide around the flanged sleeve member;
tapered arcuate flanges positioned on said sleeves for centering the forward loop of said chains on said sleeve members.

References Cited
UNITED STATES PATENTS

| | | | |
|---|---|---|---|
| 2,574,159 | 11/1951 | Tarrant | 222—178 X |
| 2,767,963 | 10/1956 | Ringen et al. | 222—176 X |
| 2,824,671 | 2/1958 | Meincke | 222—177 |
| 3,325,170 | 6/1967 | Smith | 239—680 |

ROBERT B. REEVES, Primary Examiner

H. S. LANE, Assistant Examiner

U.S. Cl. X.R.

239—650; 280—63